(12) United States Patent
Alizon et al.

(10) Patent No.: US 7,926,460 B2
(45) Date of Patent: Apr. 19, 2011

(54) AIR SUPPLY DISTRIBUTOR FOR AN INTERNAL COMBUSTION ENGINE

(75) Inventors: Franck Alizon, Verneuil-sur-Seine (FR); Pierre Anthoine, Rueil-Malmaison (FR)

(73) Assignee: Renault S.A.S., Boulogne Billancourt (FR)

( * ) Notice: Subject to any disclaimer, the term of this patent is extended or adjusted under 35 U.S.C. 154(b) by 470 days.

(21) Appl. No.: 12/095,809

(22) PCT Filed: Nov. 23, 2006

(86) PCT No.: PCT/FR2006/051215
§ 371 (c)(1),
(2), (4) Date: Jul. 24, 2008

(87) PCT Pub. No.: WO2007/063238
PCT Pub. Date: Jun. 7, 2007

(65) Prior Publication Data
US 2008/0276894 A1 Nov. 13, 2008

(30) Foreign Application Priority Data
Dec. 1, 2005 (FR) .................................... 05 12206

(51) Int. Cl.
*F02M 35/10* (2006.01)
*F02M 35/112* (2006.01)
(52) U.S. Cl. .............................. 123/184.38; 123/184.45
(58) Field of Classification Search . 123/184.38–184.45
See application file for complete search history.

(56) References Cited

U.S. PATENT DOCUMENTS

| 7,607,412 B2 * | 10/2009 | Alizon et al. ............ 123/184.38 |
| 2001/0022167 A1 * | 9/2001 | Brassell et al. .......... 123/184.42 |
| 2003/0136368 A1 * | 7/2003 | Ausiello et al. ......... 123/184.42 |
| 2003/0172894 A1 * | 9/2003 | Iwata et al. ............. 123/184.42 |

FOREIGN PATENT DOCUMENTS

| DE | 10028047 | 12/2001 |
| EP | 1455081 | 9/2004 |
| FR | 2 868 132 | 9/2005 |
| JP | 62 162766 | 7/1987 |
| JP | 9 317578 | 12/1997 |
| JP | 11 350963 | 12/1999 |
| JP | 2003 074357 | 3/2003 |

OTHER PUBLICATIONS

U.S. Appl. No. 12/095,810, filed Jun. 2, 2008, Alizon, et al.

* cited by examiner

*Primary Examiner* — Stephen K Cronin
*Assistant Examiner* — Arnold Castro
(74) *Attorney, Agent, or Firm* — Oblon, Spivak, McClelland, Maier & Neustadt, L.L.P.

(57) ABSTRACT

An air distributor including a cylindrical tubular body including connecting channels for supplying cylinders of an internal combustion engine, branches of which open in an aligned manner along a generatrix of the tubular body. The tubular body extends upstream into the branches of a 180° elbow that opens at an air inlet, the elbow inclined in relation to the diametral plane of the tubular body containing generatrix. A recess is provided in the tubular body opposite the branches of the first and second distributed cylinders. The recess has a converging/diverging profile around the lowest area between the branches, and the recess can use Venturi effect to reduce drop in swirl in the second distributed cylinder induced by architecture of the inclined elbow distributor, by regulating airflows in the channels. The distributor can mount to an intake face of a diesel engine cylinder head with two intake ducts per cylinder.

13 Claims, 2 Drawing Sheets

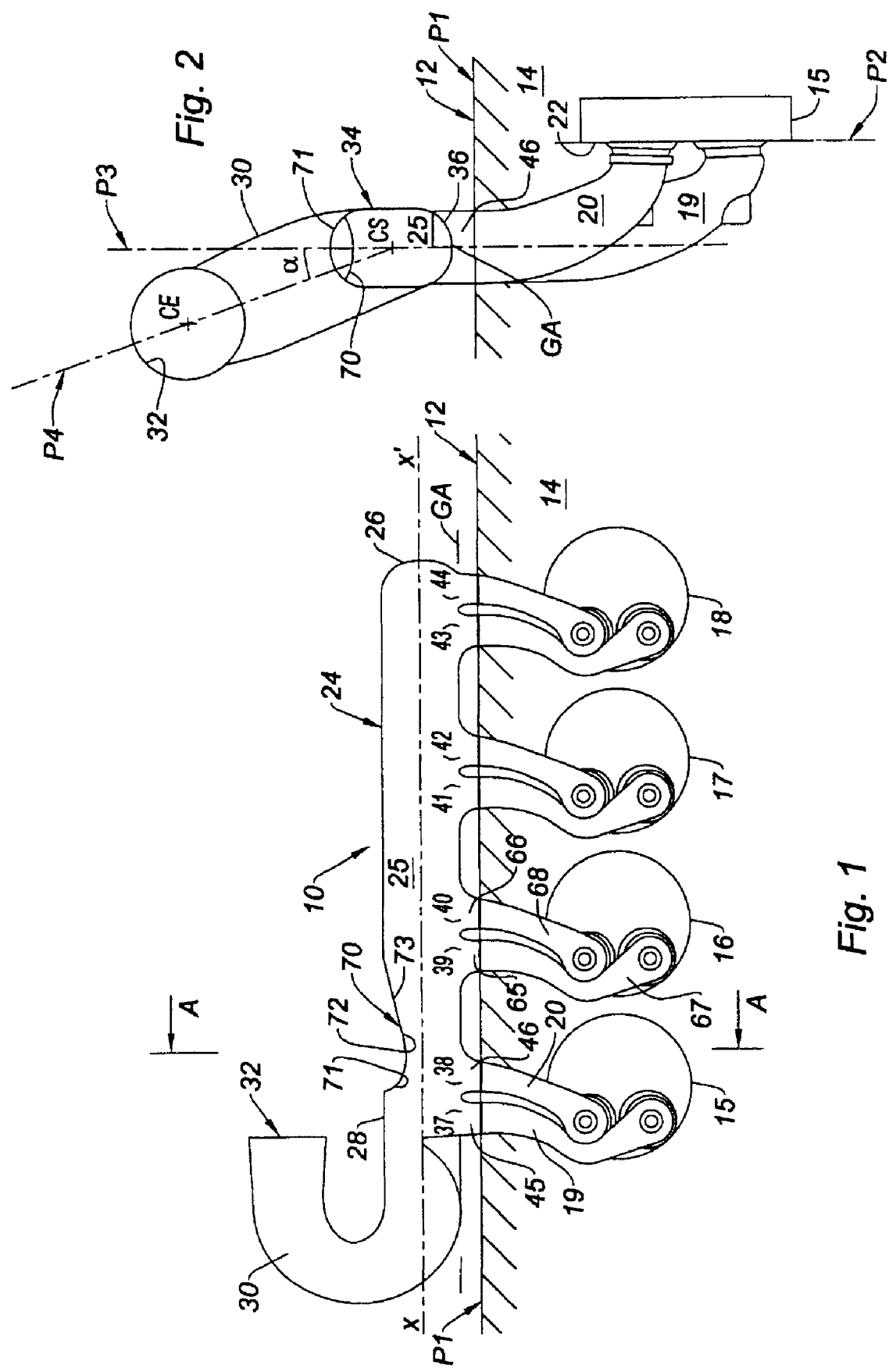

AIR SUPPLY DISTRIBUTOR FOR AN INTERNAL COMBUSTION ENGINE

BACKGROUND OF THE INVENTION

The present invention relates to an intake air distributor for the cylinders of an internal combustion engine, in particular for motor vehicles, with the understanding that the term "air" must be considered in its broad sense and in particular to cover any gas intake mixture, in particular air/fuel mixtures.

In general, the intake air distribution in the cylinders of an internal combustion engine is carried out while attempting to eliminate or substantially reduce any imbalance in the feed to each of the cylinders, both for a given cylinder in case of a plurality of intake ducts and for the distribution between the cylinders. In diesel engines having two intake ducts per cylinder in particular, for which the aerodynamics of the intake gases is critical, drops in "swirl" have been observed in certain cylinders, in particular in the second distributed cylinder, caused by the geometry of the distributor ("swirl" can be defined as an axial eddy in the cylinder). This is true in particular of air distributors bent at 180°, particularly when, for reasons of size and compactness of the engines to be mounted in the engine compartment of a motor vehicle, the elbow is inclined to a diametral reference plane of the tubular body passing through the line of alignment of the branches of the connecting channels of the cylinder intake ducts.

The invention relates to a distributor for improved supply to the second distributed cylinder with regard to the geometry of the distributor and it is a particular object of the invention to remedy the drawbacks described above.

Publication JP2003074357 in particular teaches an air distributor for an internal combustion engine of the type having two intake valves per cylinder having an axial end air intake, and in which the curvatures of the connecting channels are suitable for making the "swirl" uniform between the cylinders. Publication JP63208616 also teaches an air distributor for an internal combustion engine having four cylinders in line, having one intake valve per cylinder, and a central lateral inlet between the second and third cylinders, and in which the inlet of the connecting channel of the third cylinder comprises an air guide to give the flow lines, upstream of the cylinder head, the same radius of curvature, and in the same direction, as at the second cylinder. Publication JP113509963 also teaches an air distributor without connecting channels for an internal combustion engine having three cylinders in line, of the type having one intake valve and in which projections are placed for adjusting to a constant profile between the first and second distributed cylinders and between the second and third distributed cylinders. It should be observed that the solutions proposed in these three Japanese publications for balancing the "swirl" between the cylinders only concern air distributors having particular structures and quite different from the bent air distributors, and for which the internal aerodynamic disturbances associated with or caused by these known distributors do not exist.

SUMMARY OF THE INVENTION

The invention proposes an air distributor for an internal combustion engine comprising at least a plurality of cylinders in line with two intake ducts per cylinder, said distributor comprising a substantially cylindrical main tubular body provided with lateral connecting channels for supplying the cylinders, and whereof the branches with the main tubular body open in a substantially aligned manner along a generatrix of said main tubular body, the main tubular body extending upstream of said branches by a substantially 180° elbow opening on an air inlet, said elbow being inclined to the diametral plane of said main body containing the generatrix for alignment of the branches, characterized in that it comprises a recess placed in the tubular body opposite the branches of the connecting channels of the first and the second distributed cylinder and having a lowest area between the branches of the first and second distributed cylinders.

As it will appear in the description, such an arrangement serves to regulate the flows between the two connecting channels of the second distributed cylinder.

According to a preferred embodiment, the distributor is suitable for being mounted parallel to the corresponding intake face of the cylinder head of said engine with the connecting channels placed opposite the cylinder head intake ducts corresponding to the respective cylinders and parallel to the alignment of the cylinders, so that said diametral plane is normal to said cylinder head intake face. Such an arrangement serves to improve the compactness of the engine equipped with the distributor.

According to a first alternative of the distributor according to the invention, the lowest area is placed just downstream of the downstream branch of the first distributed cylinder. Advantageously, the recess has a convergent/divergent profile in the air flow direction in the tubular body on either side of the lowest area, in particular a convergent/divergent profile extending substantially from downstream of the upstream branch of the first distributed cylinder to upstream of the downstream branch of the second distributed cylinder.

According to another alternative of the invention, the recess extends substantially perpendicular to the air flow direction in the tubular body.

According to a further alternative of the invention, the distributor comprises, upstream and in the neighborhood of the branches of the ducts of the first distributed cylinder and on the side of the elbow inclination, a partial throttling ramp of the air flow passage of the main body. Advantageously, the ramp is in the form of an asymmetrical wheel ramp of which the upstream and downstream faces are gently and steeply inclined, respectively, said ramp being inclined laterally to said diametral plane.

Such an arrangement at the first distributed cylinder on the one hand affects the internal aerodynamics of the distributor and on the other serves to recover "swirl" levels which are substantially equal in the various cylinders of the engine, with a rise of the "swirl" in the first distributed cylinder, and to regulate the flows between the two connecting channels of the same first distributed cylinder. It should be observed advantageously that there is no negative interaction between the aerodynamic arrangements of the second and first distributed cylinders that is liable to negatively affect the efficiency of one or the other of the arrangements. In particular, the efficiency obtained for the air distributor by the sole presence of the aerodynamic arrangement in the second distributed cylinder is virtually unaffected by the introduction, upstream of the aerodynamic arrangement in the first distributed cylinder. It was thereby possible to confirm that an inclined elbow distributor according to the invention, combining the two aerodynamic arrangements in the first and second distributed cylinders, only causes a very slight dispersion of the "swirl" from one cylinder to another.

According to a further alternative of the invention, the distributor comprises substantially at the elbow outlet, facing and upstream of said ramp, a second recess extending substantially perpendicular to the air flow direction in the tubular body. Advantageously, the second recess has a convergent/divergent profile in the air flow direction in the tubular body.

Such a second recess or protuberance serves to improve the overall permeability of the distributor and, in particular, for the first distributed station, with the understanding that the permeability of a nozzle corresponds to its capacity to allow an air flow to pass through for a given energy loss. Here also, the introduction of the second recess in combination with the two aerodynamic arrangements further improves the performance, in particular the flow performance, of the air distributor according to the invention.

According to a further alternative of the invention, the first cylindrical main tubular body has a substantially rectangular cross section with rounded angles, whereof a small side corresponds to the side of the tubular body opposite the elbow and carries said aligned branches of the connecting channels.

The invention further relates to internal combustion engines, in particular for motor vehicles, comprising at least one air distributor having two connecting intake channels per distributed cylinder according to the invention in all the alternatives presented above and mounted on an intake face of the cylinder head of said engine. It relates in particular to internal combustion engines of the diesel type, in particular for motor vehicles, comprising at least one air distributor having two connecting channels per distributed cylinder according to the invention in all the alternatives presented above and mounted on an intake face of the cylinder head of said engine.

BRIEF DESCRIPTION OF THE DRAWINGS

Other features and advantages of the present invention will appear from a reading of the description that follows, provided exclusively as a nonlimiting example, with reference to the appended drawings in which:

FIG. 1 shows a schematic plan view of a first embodiment of an air distributor according to the invention in place along the intake face of an internal combustion engine cylinder head;

FIG. 2 shows a schematic view along enlarged section AA of the air distributor in FIG. 1;

DETAILED DESCRIPTION OF THE PREFERRED EMBODIMENTS

Figure 4:
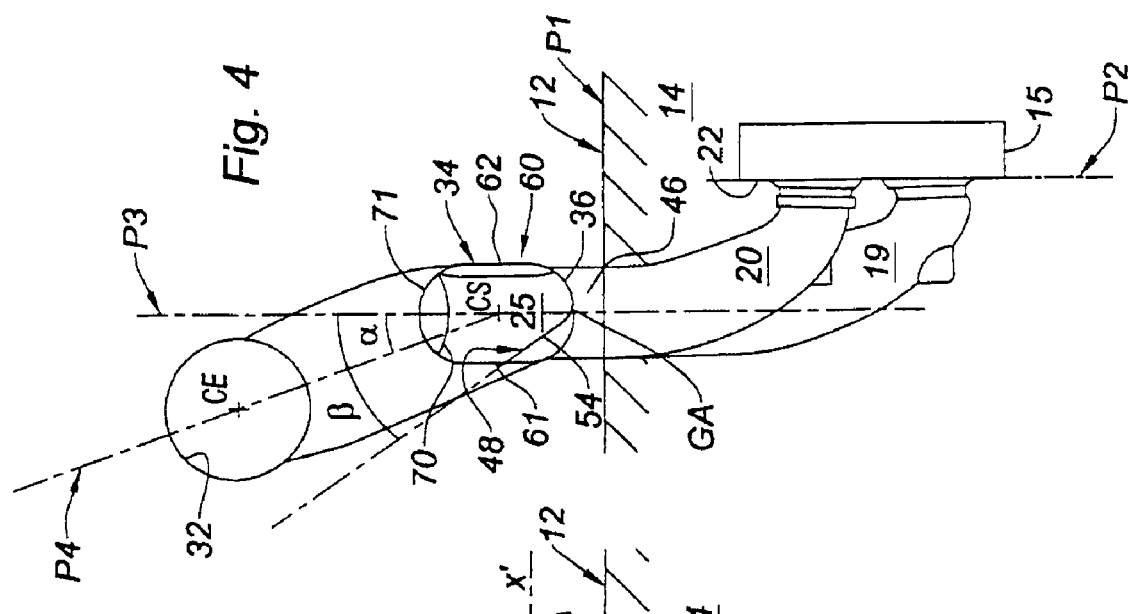
FIG. 4 shows a schematic view along enlarged section BB of the air distributor in FIG. 3.

The intake air distributor 10 shown in FIGS. 1 and 2 is shown in an operational position fixed to the intake face 12 of the cylinder head 14 of an internal combustion engine having four cylinders in line 15, 16, 17 and 18. As a nonlimiting example, the internal combustion engine integrating the cylinder head 14 is of the diesel type, particularly for a motor vehicle, but without going beyond the scope of the invention, the internal combustion engine may be of a different type, for example a 4-stroke gasoline engine, particularly for a motor vehicle.

Considering FIGS. 1 and 2, it may be observed that the cylinder head intake face 12 extends in the plane P1 normal to the plane of FIGS. 1 and 2, so that in FIG. 1, the cylinders 15 and 18 are shown from above, each having distinct intake ducts, for example for the cylinder 15, combustion first distributed cylinder, the ducts 19 and 20, whereof the ends, opening on the head of the cylinder 15 at the level of the fire face 22, each carry the seat of one of the two intake valves (not shown). For the clarity of the drawing, the exhaust valves have also not been shown. As shown in FIG. 2, the combustion face 22 extends in a plane P2 normal to the plane of the FIGS. 1 and 2 and to the plane P1.

The air distributor 10 is in the form of a bent nozzle made from light alloy obtained by molding either in one piece or in suitably assembled separate elements. The distributor 10 mainly consists of a cylindrical main tubular body 24 having an axis XX' and, when the distributor is mounted operationally on the cylinder head 14, parallel to the intake face 12 and to the combustion face 22. The body 24 which has a first closed end 26 at the last distributed cylinder, the cylinder 18, is prolonged at its other end 28 by a 180° elbow 30 opening on an air inlet or intake orifice 32 suitably connected to the ducts and engine feed devices (not shown). As may be observed in FIG. 2, the cylindrical tubular body 24 has, as a nonlimiting example, a cross section 34 having a substantially rectangular shape with rounded corners, whereof a small side 36 corresponding to the side of the body 24 opposite the elbow 32 carries the branches 37, 38, 39, 40, 41, 42, 43, 44 of the connecting channels of the distributor 10 and intended to be connected to the intake ducts of the four cylinders, for example for the first distributed cylinder 15 the branches 37 and 38 are paired respectively with the connecting channels 45 and 46 suitably connected to the intake ducts 19 and 20 provided in the cylinder head. The same applies to the branches 39 and 40 paired respectively with the connecting channels 65 and 66 connected to the intake ducts 67 and 68 of the second distributed cylinder 16. As may be observed in FIGS. 1 and 2, the branches 37 to 44 paired in tandem are substantially aligned along the generatrix GA of the cylindrical tubular body 24 parallel to the axis XX' and contained, like said latter axis, in the diametral plane P3 of the main body 24, said diametral plane P3 being parallel to the plane P2 of the combustion face, once the distributor 10 is mounted on the cylinder head.

Considering FIG. 2, it may be observed that the elbow 30 is inclined to the diametral plane P3 by an angle of inclination α defined between the plane P3 and the median plane P4 of the elbow 30 defined as a nonlimiting example as a plane normal to the plane of FIG. 2 and passing through the centers CE and CS of the inlet and outlet sections of the elbow 30 in the flow direction. The angle α is generally selected to be fairly low, preferably between 10 and 25°, in the present case about 20° to the left of FIG. 2 and from P3. Obviously, without going beyond the scope of the invention, the elbow of the air distributor may be inclined in the other direction toward the right of FIG. 2, for example symmetrically about P3.

According to the invention, a recess 70 is provided, placed in the tubular body 24 opposite the branches 37 to 40 and the connecting channels 19, 20, 65 and 66 of the first distributed cylinder 15 and of the second distributed cylinder 16 and having a lowest area 72 between the branches of the first and second distributed cylinders. In general, the position and the shape of the recess 70 are selected to give the recess a venturi effect accelerating the flow and making it uniform in the inner duct 25 of the tubular body 24 upstream of the branches 39 and 40 of the second distributed cylinder 16. As may be observed in FIG. 1, and advantageously and in a nonlimiting manner, the lowest area 72 is placed just downstream of the downstream branch 38 of the first distributed cylinder 15. Also advantageously and in a nonlimiting manner, the recess has a convergent/divergent profile (upstream zone 71/downstream zone 73) in the air flow direction in the tubular body 24 on either side of the lowest area 72. In the present case, the convergent/divergent profile extends substantially from downstream of the upstream branch 37 of the first distributed cylinder 15 to upstream of the downstream branch 40 of the second distributed cylinder 16.

Furthermore, as may be observed in FIG. 2, the recess 70, having a strip or wave shape, extends substantially perpendicular to the air flow direction in the tubular body 24 (along the axis XX') and symmetrically about the plane P3. In general, the recess 70 in the inner duct 25 of the tubular body is produced directly in the casting thereof or via a part added internally (or in case of a weld-fabricated distributor, by an appropriate penetration of the distributor wall at the elbow/tubular body boundary).

Thus the venturi effect on the flow in the tubular body 24 obtained by the recess 70 serves to make the flow uniform just upstream of the connecting channels 65 and 66 of the second distributed cylinder, and to regulate the flows between the two connecting channels of the second distributed cylinder 16, and enables the corresponding aerodynamic arrangement to operate in optimal conditions, the drop in "swirl" in the second distributed cylinder 16 caused by the presence of an inclined 180° elbow on the air distributor thereby being corrected. Obviously, the recess 70 being symmetrical about the plane P3, the correction is obtained regardless of the orientation of the angle of inclination α to the left or to the right of this plane P3.

Figure 3:
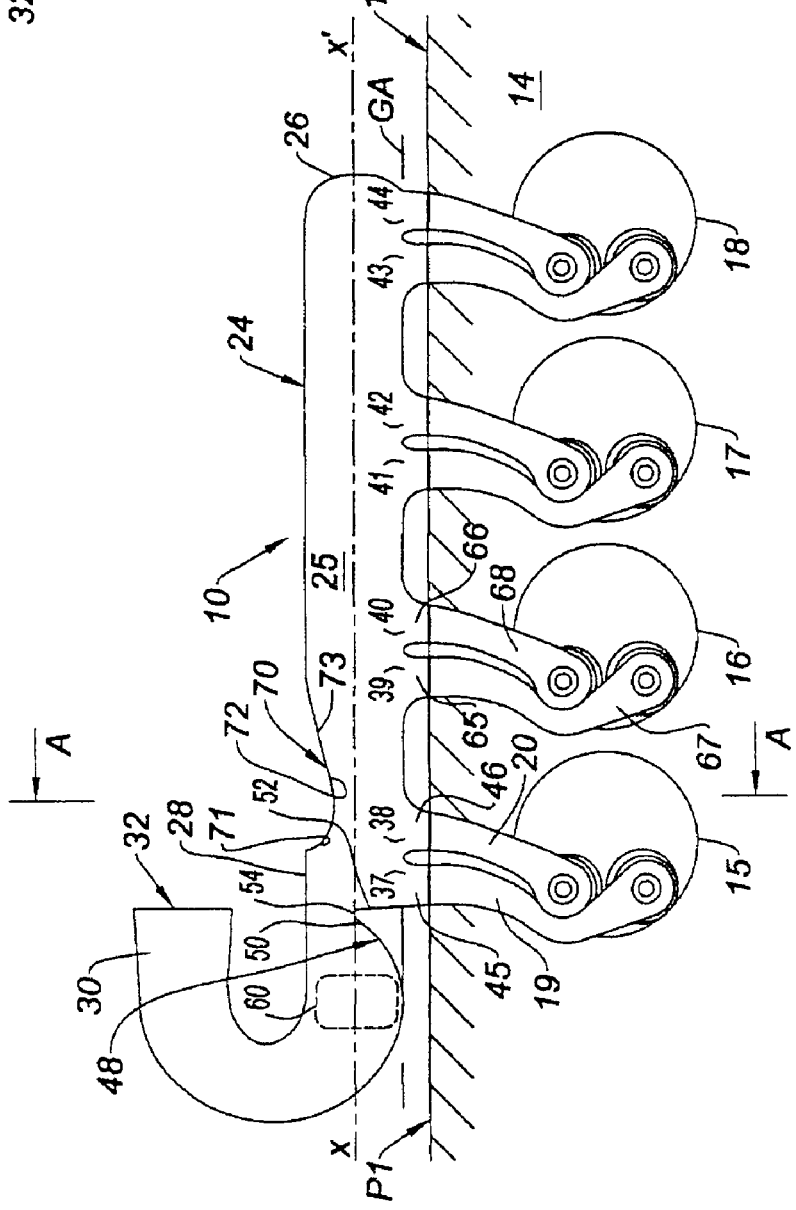
FIG. 3 shows a schematic underside view of a second embodiment of an air distributor according to the invention in place along the intake face of an internal combustion engine cylinder head.

The air distributor 10' according to the invention is virtually identical to the distributor 10. Thus, the identical elements of the two distributors are not described again and bear the same reference numerals. The two distributors are distinguished by the presence on the distributor 10' of a partial throttling ramp 48 placed at the outlet of the elbow 30 in the neighborhood of the branch 37 of the connecting channel 45 of the first distributed cylinder 15 on the side of the elbow inclination to the diametral plane P3 and substantially opposite the elbow (that is on the side corresponding to the outside of the elbow and on which the connecting branches are placed). The ramp 48 is in the form of an asymmetrical wheel ramp of which the upstream 50 and downstream 52 faces are gently and steeply inclined, respectively; in the present case as shown in FIG. 3 the face 52 is abrupt and at the limit of the branch 37. Moreover, the ramp 48 is laterally inclined to the diametral plane P3 as shown in FIG. 4. Preferably and in a nonlimiting manner, the projection of the top 54 of the ramp 48 in a normal plane to said tubular body 28 (the plane of section AA or plane of FIG. 2) has an angle of inclination β to the diametral plane P3 of between 1 and 5 times the angle of inclination α, in the present case about 40°. In general, the recessed throttling ramp 48 in the inner duct 25 of the tubular body is produced directly in the casting thereof or via a part added internally (or in case of a weld-fabricated distributor, by an appropriate penetration of the distributor wall at the elbow/tubular body boundary). The partial throttling rate is preferably between 5 and 10% of the flow passage (in the present case about 10% as shown in FIG. 2).

The presence of the ramp 48 has a dual function with regard to the aerodynamics of the air feed to the first distributed cylinder 15, on the one hand to restore a "swirl" level substantially equal to the "swirl" generated by the cylinder head without distributor in the cylinder 15 (thereby compensating for the drop in "swirl" in this cylinder 15 caused by the inclination of the elbow 30), and on the other, to regulate the flows between the two intake ducts 19 and 20 for supplying the same cylinder 15. The air distributor 10' thereby serves to correct the effects of the drop in "swirl" on the first and second distributed cylinders 15 and 16 due to the presence of the inclined elbow (this effect being negligible or even nonexistent on the following cylinders 17 and 18).

Optionally, it is also possible to place, at the outlet of the elbow 30 and upstream of the ramp 48 and on the side opposite said ramp, a second recess 60 extending substantially perpendicular to the axis XX', that is with regard to the flow in the inner duct 25 of the tubular body 24, but also perpendicular to the first recess 70 as shown in FIGS. 3 and 4. The second recess 60 extends transversally parallel to the plane P3 on the side 62 of the tubular body 24 (opposite the side 61 associated with the ramp 48) along the whole width thereof (large side of the cross section 34) and has a convergent/divergent profile (upstream zone 61/downstream zone 63). The recess 60 generally derives from material in the casting of the air distributor (it may also be produced in the form of an added part or, for weld-fabricated distributors, obtained by deformation of the elbow outlet wall). The second recess 60 mainly has the effect of improving the permeability of the distributor 10' (by increasing the air flow rate for a given energy loss) for the first distributed station, the cylinder 15, without negatively affecting the aerodynamic gain of the air distributor obtained by the ramp or wheel ramp 48. It is thus possible to at least offset the slight drop in flow rate possibly caused by the presence of the partial throttling ramp 48.

Obviously, without going beyond the scope of the invention, the elbow of the air distributor 10' may be inclined in the other direction toward the right of FIG. 2, for example symmetrically about P3, with the understanding that the corresponding partial throttling ramp will also be placed symmetrically with the ramp 28 with regard to this plane.

The invention claimed is:

1. An air distributor for an internal combustion engine including at least a plurality of cylinders in line with two intake ducts per cylinder, the distributor comprising:
   a substantially cylindrical main tubular body including lateral connecting channels for supplying the cylinders, and whereof branches with the main tubular body open in a substantially aligned manner along a generatrix of the main tubular body, the main tubular body extending upstream of the branches by a substantially 180° elbow opening on an air inlet, the elbow being inclined to the diametral plane of the main body containing the generatrix for alignment of the branches; and
   a recess in the tubular body opposite the branches of the connecting channels of the first and the second distributed cylinder and having a lowest area between the branches of the first and second distributed cylinders.

2. The air distributor as claimed in claim 1, wherein the lowest area is just downstream of the downstream branch of the first distributed cylinder.

3. The air distributor as claimed in claim 1, wherein the recess has a convergent/divergent profile in air flow direction in the tubular body on either side of the lowest area.

4. The air distributor as claimed in claim 3, wherein the convergent/divergent profile extends substantially from downstream of the upstream branch of the first distributed cylinder to upstream of the downstream branch of the second distributed cylinder.

5. The air distributor as claimed in claim 1, wherein the recess extends substantially perpendicular to air flow direction in the tubular body.

6. The air distributor as claimed in claim 1, further comprising, upstream and in the neighborhood of the branches of the connecting channels of the first distributed cylinder and on the side of the elbow inclination, a partial throttling ramp of the air flow passage of the main tubular body.

7. The air distributor as claimed in claim 6, wherein the ramp is in a form of an asymmetrical wheel ramp of which upstream and downstream faces are gently and steeply inclined, respectively, the ramp being inclined laterally to the diametral plane.

8. The air distributor as claimed in claim 6, further comprising, substantially at the elbow outlet, facing and upstream of the ramp, a second recess extending substantially perpendicular to the air flow direction in the tubular body.

9. The air distributor as claimed in claim 8, wherein the second recess has a convergent/divergent profile in air flow direction in the tubular body.

10. The air distributor as claimed in claim 1, wherein in its linear portion, the tubular body has a substantially rectangular cross section with rounded angles, whereof a small elbow side corresponds to the side of the tubular body opposite the elbow and carries the branches of the connecting channels.

11. The air distributor as claimed in claim 1, configured to be mounted parallel to a corresponding intake face of a cylinder head of the engine with the connecting channels placed opposite the cylinder head intake ducts corresponding to the respective cylinders and parallel to alignment of the cylinders, so that the diametral plane is normal to the cylinder head intake face.

12. An internal combustion engine, for a motor vehicle, comprising at least one air distributor as claimed in claim 1, mounted on an intake face of a cylinder head of the engine.

13. An internal combustion engine of diesel type, for a motor vehicle, comprising at least one air distributor as claimed in claim 1, mounted on an intake face of a cylinder head of the engine.

* * * * *